J. METZLER.
AMUSEMENT APPARATUS.
APPLICATION FILED OCT. 16, 1917.
1,263,269.
Patented Apr. 16, 1918.
5 SHEETS—SHEET 5.
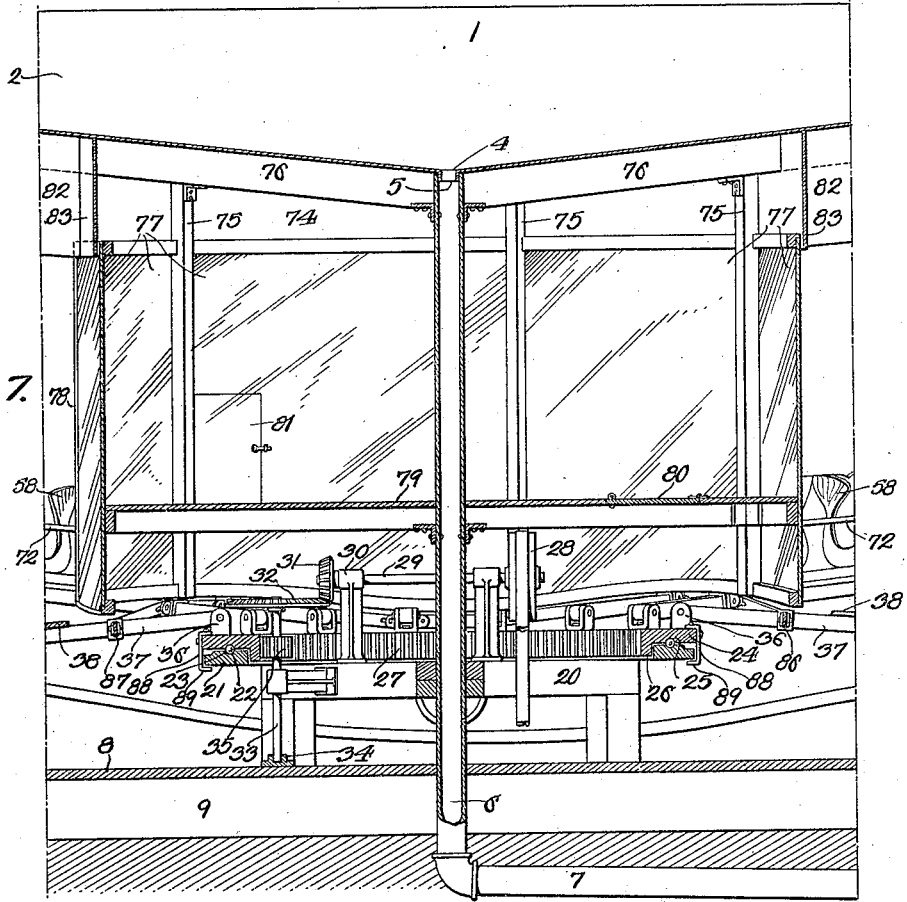
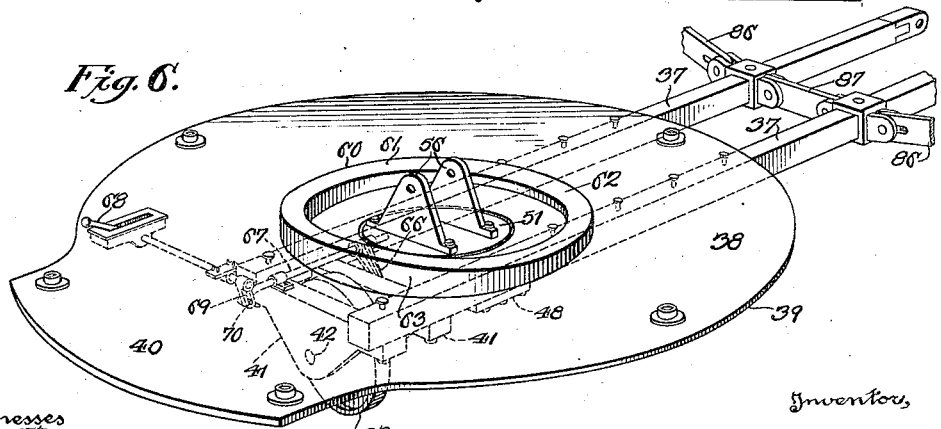

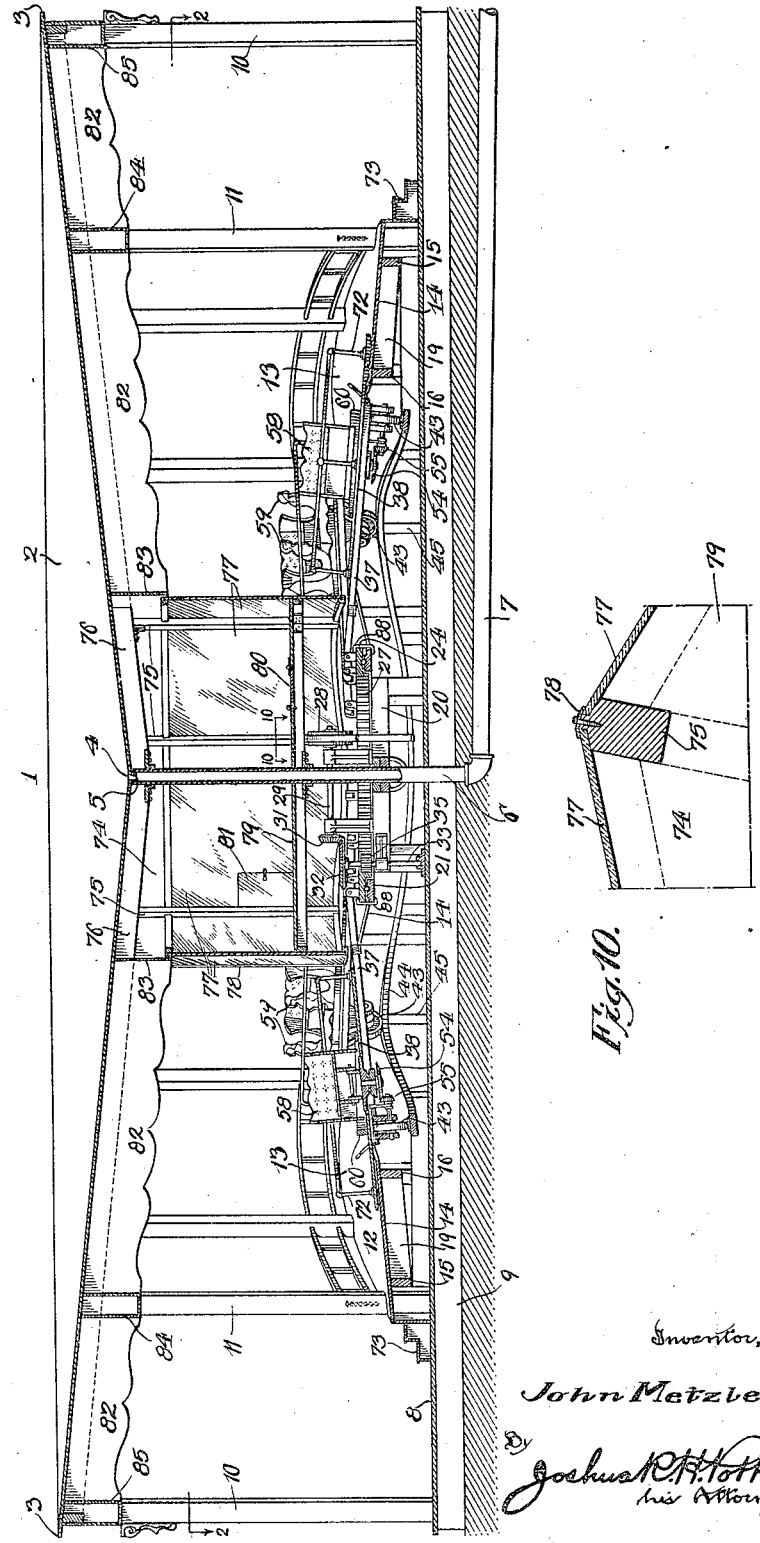

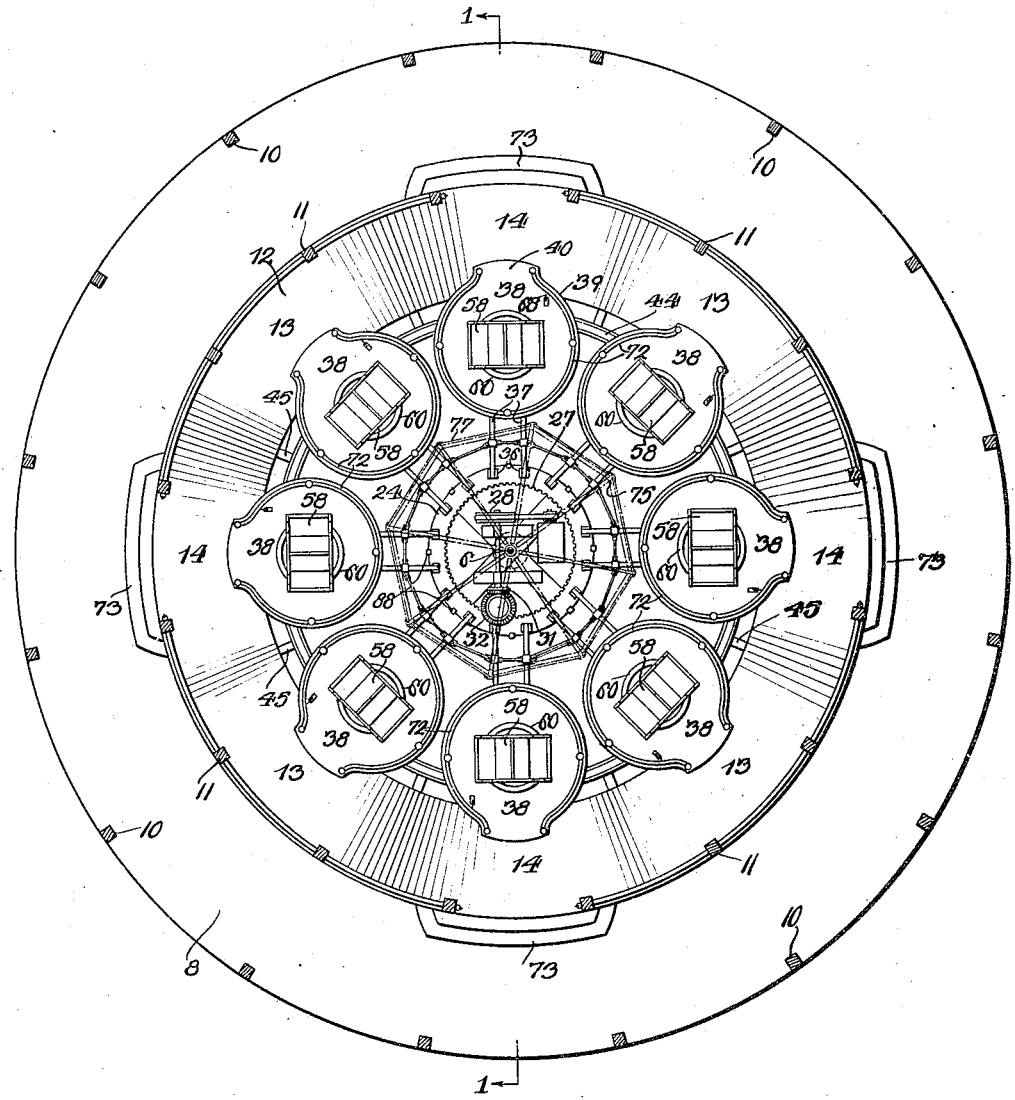

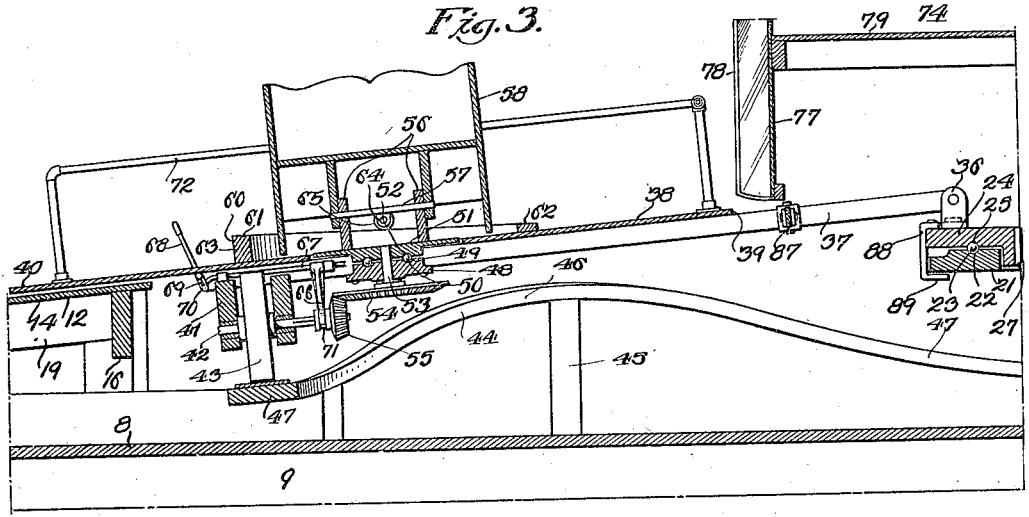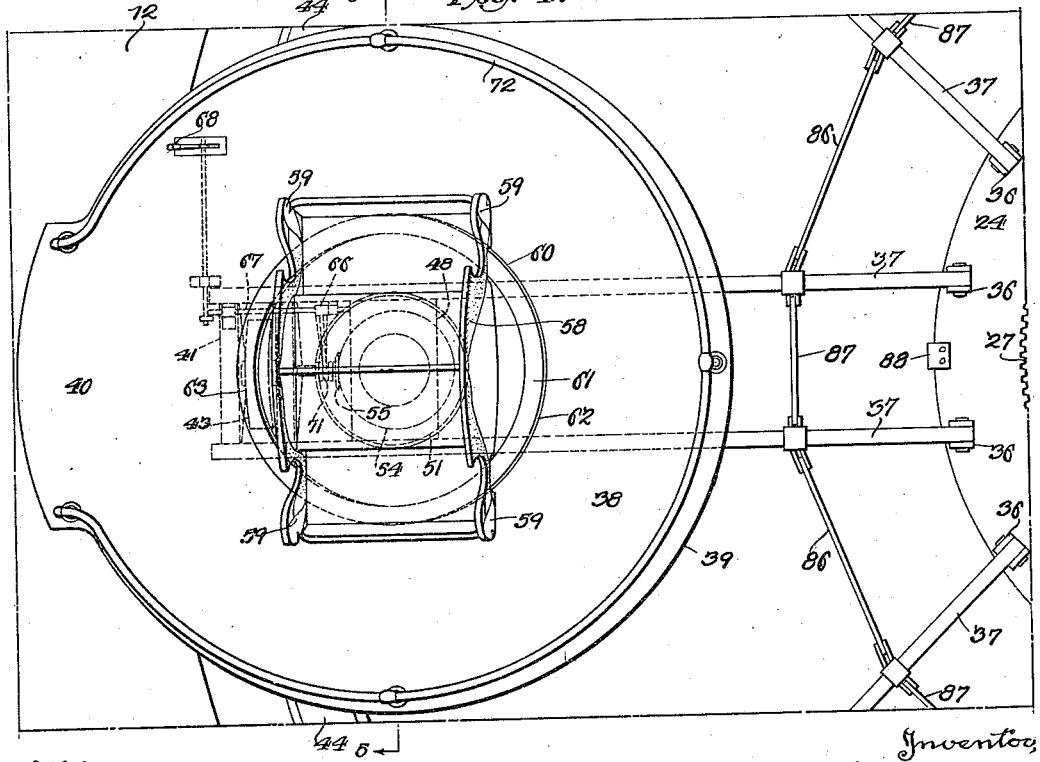

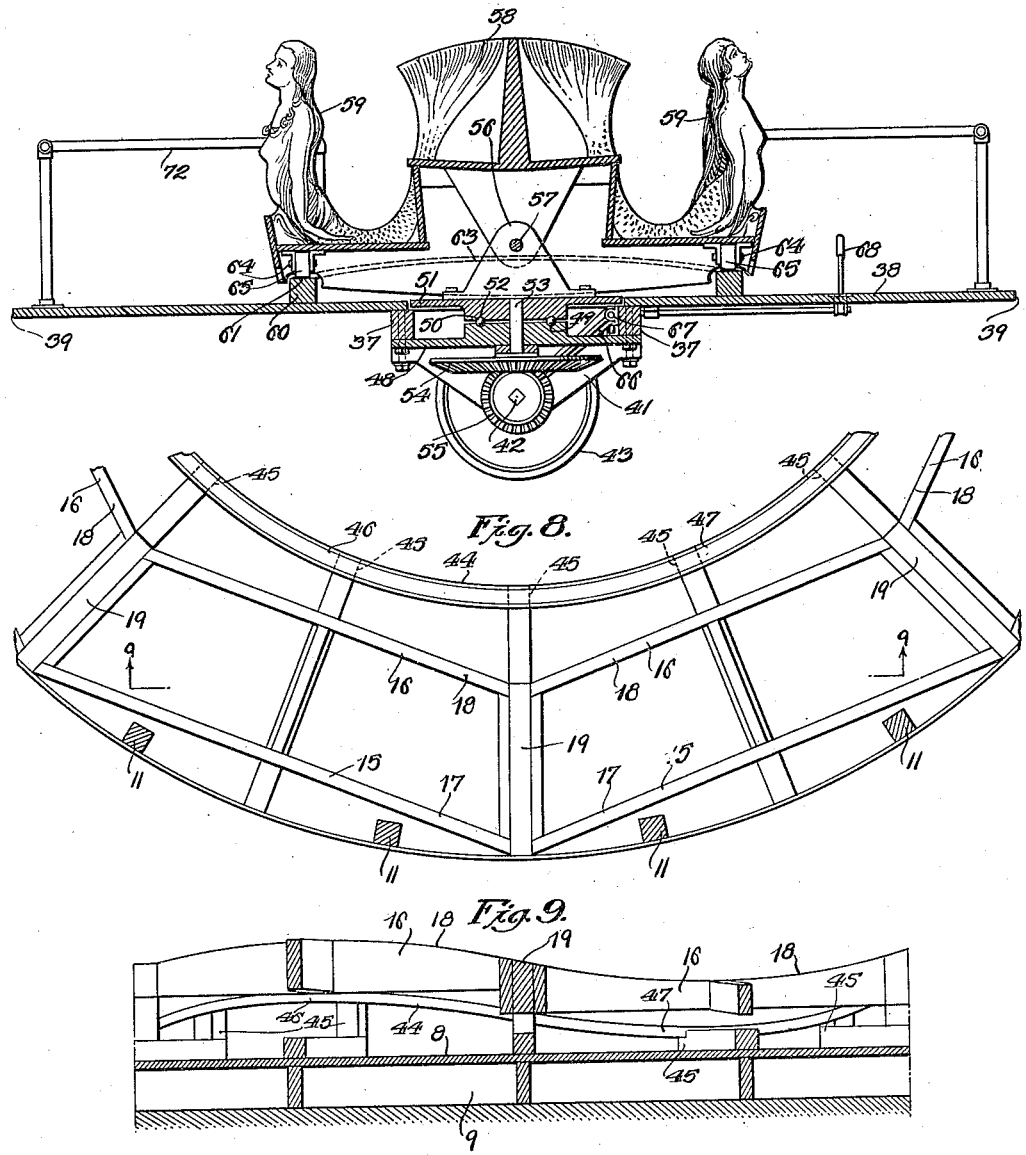

UNITED STATES PATENT OFFICE.

JOHN METZLER, OF PHILADELPHIA, PENNSYLVANIA, ASSIGNOR OF ONE-HALF TO HUGH McHENRY, OF PHILADELPHIA, PENNSYLVANIA.

AMUSEMENT APPARATUS.

1,263,269.  Specification of Letters Patent.  Patented Apr. 16, 1918.

Application filed October 16, 1917. Serial No. 196,786.

*To all whom it may concern:*

Be it known that I, JOHN METZLER, a subject of the Emperor of Germany, residing at Philadelphia, in the county of Philadelphia and State of Pennsylvania, have invented certain new and useful Improvements in Amusement Apparatus, of which the following is a specification.

One object of my invention is to provide a novel amusement apparatus which will be particularly adapted for use in amusement parks or other places where there are large assemblages of persons.

Another object is to construct my invention so that it will be operative to permit a great number of persons to ride thereon simultaneously, the movement of the apparatus being such as to produce pleasing and novel sensations to the riders.

A further object is to make my improved amusement apparatus safe, durable, pleasing in appearance and so that it can be operated with a minimum amount of power.

These objects, and other advantageous ends which will be described hereinafter, I attain in the following manner, reference being had to the accompanying drawings in which—

Figure 1 is a sectional elevation taken on the line 1—1 of Fig. 2.

Fig. 2 is a sectional plan taken on the line 2—2 of Fig. 1.

Fig. 3 is an enlarged fragmentary sectional elevation of a portion of my invention.

Fig. 4 is a plan view of Fig. 3.

Fig. 5 is a section taken on the line 5—5 of Fig. 4 and drawn on an enlarged scale.

Fig. 6 is a perspective of certain of the elements shown in Fig. 4.

Fig. 7 is an enlarged fragmentary sectional elevation of the central portion of the apparatus.

Fig. 8 is a fragmentary plan view partly in section of a portion of the supporting structure with the floor removed.

Fig. 9 is a section on the line 9—9 of Fig. 8.

Fig. 10 is an enlarged section taken on the line 10—10 of Fig. 1.

Referring to the drawings, 1 represents a pavilion which has a frustro-conical roof 2 which tapers downwardly from its circumferential edge 3 and has an opening 4 at its center which is surrounded by a depending flange 5.

A central hollow post or pipe 6 supports the central portion of the roof 2 and the flange 5 fits within the top of this post as clearly shown in Figs. 1 and 7. This post 6 connects with a drain pipe 7, so that water falling upon the roof 2 will run to the center of the roof, thence through the opening 4, post 6, and out through the drain 7.

A main floor 8 is provided and preferably raised a slight distance from the top of the ground level 9 as clearly shown in Fig. 1. A row of supporting posts 10 are arranged concentric with the post 6 and serve to support the roof 4 adjacent the edge 3. A second row of posts 11 are arranged concentric with the posts 6 and serve to support the roof 3 at positions intermediate the posts 10 and the post 6.

A super floor or platform 12 is spaced above the main floor 8 and is in the form of a ring which surrounds the post 6 as clearly shown in Figs. 1 and 2. This floor is undulated or waved so that it includes a series of swelled portions 13 alternating with recessed portions 14. The supporting structure for this super floor 12 is clearly shown in Figs. 8 and 9 and consists of two series of beams 15 and 16 which have their upper edge surfaces 17 and 18 respectively undulated or waved as clearly shown in Fig. 9.

Radial tie beams 19 serve as the connections between the beams 15 and 16 and thereby provide a rigid support for the super floor 12. A central supporting structure 20 forms a support for an annular ring bearing 21 which is grooved at 22 as clearly shown in Figs. 1 and 7. The groove 22 provides a race for ball bearings 23. An upper ring gear 24 has a ball bearing groove 25 and an inner flange 26 which fits within the ring 21 and is provided with internal gear teeth 27.

It will thus be noted that the upper ring 24 is free to rotate on the ring bearing 21 for a purpose hereinafter to be described. A main driving pulley 28 is secured to a shaft 29 which is mounted in suitable bearings 30. The shaft 29 has a pinion 31 secured thereto and which meshes with a beveled gear 32. This latter gear is secured to a vertical shaft 33 which is mounted in a step bearing 34 on the main floor 8.

The shaft 33 has a pinion 35 which meshes with the gear teeth 27 of the upper ring 24 and thereby rotates this ring under certain conditions as will hereinafter be described. The ring 24 carries a plurality of pairs of lugs 36 and each pair of these lugs form pivotal supports for a pair of bars 37. The bars of each pair are arranged parallel, but substantially radial to the axis of the post 6.

Each pair of the bars 37 supports a plate 38 which has a circular edge 39 which blends with an extension 40 in the form of a lip as clearly shown in Figs. 2, 4, and 6.

Each plate 38 has secured to its bars 37, brackets 41 which form the bearing for a shaft 42 upon which is rotatably mounted a wheel 43. These wheels 43 are adapted to ride upon a track 44 which is supported by standards 45 on the main floor 8. The track 44 is undulated and has swell portions 46 which alternate with recessed portions 47 corresponding to the swell portions 13 and recessed portions 14 of the super floor 12.

Each pair of bars 37 forms a support for a bearing plate 48 which is grooved at 49 to form a race for ball bearings 50. A disk 51 is grooved at 52 for the reception of the ball bearings 50 and thus a rotatable support is made for the disk 51. This disk 51 has a shaft 53 connected thereto, the lower end of which is provided with a beveled gear 54 which meshes with a pinion 55 on the shaft 42.

It will thus be understood that the rotatable movement of the wheel 43 on the track 44 will impart rotation to the disk 51. The disk 51 supports standards 56 which form a rocking bearing for a shaft 57. This shaft 57 forms a pivotal support for a carriage or seat 58 which has ornamental super structure in the present instance, in the form of "mermaids" 59.

Each plate 38 has a track 60 on its upper surface which is made concentric with the axis of the shaft 53. The upper edge surface 61 of this track varies in height with respect to the upper surface of the plate 38 and in the illustration is in the form of a tapered ring having a low portion 62 and a high portion 63. Each of the carriages 58 forms a support for other shafts 64 having rollers 65 thereon which are adapted to engage the surface 61 of the track 60 so that upon rotation of the disk 51, the carriage 58 will be rocked on the shaft 57 as a pivot as well as to receive the rotary movement which is imparted to the disk 51.

The pinion 55 is slidably keyed to the shaft 42 and can be moved out of mesh with the gear 54 through the medium of a bracket 66 which is secured to a rod 67 mounted below the plate 38. This shaft can be moved longitudinally by means of a hand lever 68 which is pivoted to the plate 38 and has a slot 69 through which a pin 70 on the rod 67 projects. The lower end of the bracket 66 engages a collar 71 which is secured to the beveled pinion 55. Thus, when the lever 68 is moved in opposite directions, the beveled pinion 55 will be moved into and out of mesh with the beveled gear 54, thereby permitting rotation of the carriage 58 relatively to the plate 38 or to permit no relative movement between the carriage and plate 38 according to the desire of the occupants of the carriage.

Each plate 38 has a hand rail 72 extending completely around the same with the exception at the lip 40 where it is interrupted to provide a passageway for persons who wish to ride on the apparatus. Steps 73 are provided at different points whereby persons may walk from the main floor 8 to the platform or super floor 12, it being noted that the lips 40 on the plates 38 always extend above the top of the floor 12 but in close proximity thereto. This is clearly shown in Figs. 1, 3, and 4.

A turret chamber 74 is provided by posts 75 which are arranged circumferentially of the posts 6 and depend from joists 76 which support the roof 2. These posts 75 stop short of the main floor 8 so as to permit the bars 37 to move thereunder.

Plate mirrors 77 extend between the posts 75 and are secured thereto by strips 78 as clearly shown in Fig. 10. These mirrors form panels between the posts 75 and thus provide a closure for the turret chamber 74. I preferably provide a floor 79 within the turret chamber and support the same on the posts 75 and the central post 6. This floor 79 is mounted above the driving mechanism as clearly shown in Fig. 1 and is provided with a trap door 80 so that a man can gain access to the driving machinery located below.

Another door 81 is provided in one of the panels so that a person can gain access to the chamber 74. The joists 76 are arranged radially with respect to the post 6 and depending ornamental wings 82 are secured to the joists (see Fig. 1). Also, other wings 83, 84, and 85 depend and connect the radial wings 82. These wings 83, 84, and 85 are substantially concentric, the wings 84 and 85 extending between the respective posts 10 and 11, while the wing 83 depends in front or on the outside of the mirrors 77. These wings may be ornamented in any manner desired and provide a pleasing ornamentation for the roof structure.

The operation of my apparatus is as follows:

Power is transmitted through the medium of the pulley 28 from any source and this movement is transmitted to the upper ring gear 24 and causes the latter to rotate. Since the plates 38 are pivotally connected to the ring gear 24 by means of the bars 37, the plates 38 will be caused to rotate around the axis of the post 6, the wheels 43 running on the track 44. Since this track is undulated, the plates 38, bars 37, and all the elements supported by said bars 37, will receive an undulated movement corresponding to the contour of the track 44.

The platform 12, having the same undulated construction as the track 44, permits the overhanging lip portions of the plates 38 to always follow in close proximity thereto whether on the swelled portions or recessed portions of the track 44. This construction, to the occupants of the respective carriages or seats 58, produces a wave-like illusion and affords amusement to the riders.

The rotation of the wheels 43 on the track 44 also imparts a relative rotary movement to the carriages 58 with respect to the plates 38, and the fact that the rollers 65 engage the tapered tracks 60 on the plates 38, causes a rocking movement of the carriages on the shafts 57 as pivots. Thus, the riders receive a combination of four separate movements, namely, the rotary movement with the post 6 as the axis, second, a rising and falling movement imparted by the undulations of the tracks 44, third, the rotary movement with respect to the plates 38, and fourth, the rocking movement imparted by the irregular or tapered tracks 60 through the medium of the rollers 65 and shafts 57.

If all of these movements combined are too strenuous for the occupants of any particular carriage, it is merely necessary to operate the lever 68 to throw the beveled pinion 55 out of engagement with the beveled gear 54. This will stop the rotary movement of the carriage with respect to its plate 38 and consequently stop the rocking movement of the carriage on the shaft 57 as a pivot.

In order that the bars 37 may be positioned in close proximity at all times to the bottoms of the mirrors 77 which form the panels for the turret chamber 74, the bottom edges of these mirrors are preferably made of the same contour as the track 44 and platform 12 as clearly shown in Fig. 1.

The plates 38 are made sufficiently large to permit standing room around the carriages so that if persons desire to stand still while riding, they may support themselves by the rails 72.

Each pair of bars 37 are connected together by pivotally arranged links 86 which connect the bars between their pivotal connection with the lugs 36 and their free ends. The bars 37 of each pair are connected together by pivotally arranged links 87. Thus, by the connection of the links 86 and 87, the power from the ring gear 24 is evenly distributed and thus relieves strain on the lugs 36 which might otherwise occur if the links 86 and 87 were omitted.

Furthermore, clips 88 are secured to the ring gear 24 and have bent ends 89 which extend under the ring 21 which forms the bearing for the ring gear 24. Thus, the clips 88 and flange 26 prevent displacement of the ring 24 under operating conditions.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. In an apparatus of the character described, a carriage rotatable around an axis, means for imparting an undulated movement of said carriage around said axis, and means for imparting an independent rocking and rotatable undulated movement to said carriage and operative through the medium of said first rotatable movement of the carriage around the axis, substantially as described.

2. In an apparatus of the character described, a carriage rotatable around an axis, means for imparting an undulated movement of said carriage around said axis, and an undulated platform surrounding said axis and adjacent which said carriage travels, substantially as described.

3. In an apparatus of the character described, a carriage rotatable around an axis, an undulated track surrounding said axis, a wheel movable in conjunction with said carriage and adapted to ride on said track to receive movement from the undulations thereof, and means for imparting an independent rocking and rotatable undulated movement to said carriage and operative through the medium of said first rotatable movement of the carriage around the axis, substantially as described.

4. In an apparatus of the character described, a carriage rotatable around an axis, an undulated track surrounding said axis, a wheel movable in conjunction with said carriage and adapted to ride on said track to receive movement from the undulations thereof, and an undulated platform surrounding said axis and adjacent which said carriage travels, substantially as described.

5. In an apparatus of the character described, a carriage rotatable around an axis, an undulated track surrounding said axis, and a wheel movable in conjunction with said carriage and adapted to ride on said track to receive movement from the undulations thereof, rotatable means connected to said carriage, a supporting structure forming a rotatable bearing for said latter means, and means for rotating said latter means on its bearing, substantially as described.

6. In an apparatus of the character described, a carriage rotatable around an axis, an undulated track surrounding said axis, and a wheel movable in conjunction with said carriage and adapted to ride on said track to receive movement from the undulations thereof, rotatable means connected to said carriage, a supporting structure forming a rotatable bearing for said latter means, and means operatively connected to said carriage and wheel whereby a rotation of the latter imparts a rotary movement of said carriage relatively to said supporting structure, substantially as described.

7. In an apparatus of the character described, a carriage rotatable around an axis, an undulated track surrounding said axis, and a wheel movable in conjunction with said carriage and adapted to ride on said track to receive movement from the undulations thereof, rotatable means connected to said carriage, a supporting structure forming a rotatable bearing for said latter means, means operatively connected to said carriage and wheel whereby a rotation of the latter imparts a rotary movement of said carriage relatively to said supporting structure, and means for disconnecting said latter means to stop said latter movement of the carriage, substantially as described.

8. In an apparatus of the character described, a carriage rotatable around an axis, means for imparting an undulated movement of said carriage around said axis, and means for imparting an independent rocking and undulated rotatable movement of said carriage, substantially as described.

9. In an apparatus of the character described, a carriage rotatable around an axis, means for imparting an undulated movement of said carriage around said axis, means for imparting an independent rotatable movement of said carriage, and means for rocking said carriage independently of said other movements, substantially as described.

10. In an apparatus of the character described, a carriage rotatable around an axis, means for imparting an undulated movement of said carriage around said axis, means for imparting an independent rotatable movement of said carriage, a supporting structure for said carriage and upon which said carriage is pivotally mounted, a track having portions of varying contour, and means for engagement with said portions and adapted to rock said carriage on its pivot during the movement of said latter rotatable means, substantially as described.

11. In an apparatus of the character described, a carriage rotatable around an axis, means for imparting an undulated movement of said carriage around said axis, means for imparting an independent rotatable movement of said carriage, a supporting structure for said carriage and upon which said carriage is pivotally mounted, a track having portions of varying contour, and rollers connected to said carriage and designed to roll upon said track whereby the rotation of said latter rotatable means imparts a rocking movement to said carriage, substantially as described.

12. In an apparatus of the character described, a carriage rotatable around an axis, an undulated track surrounding said axis, a wheel movable in conjunction with said carriage and adapted to ride on said track to receive movement from the undulations thereof, rotatable means connected to said carriage, a supporting structure forming a rotatable bearing for said latter means, a shaft connected to said latter means, a gear on said shaft, a gear operatively connected to said wheel and adapted to engage said first gear whereby movement is imparted to said latter rotatable means, substantially as described.

13. In an apparatus of the character described, a carriage rotatable around an axis, an undulated track surrounding said axis, and a wheel movable in conjunction with said carriage and adapted to ride on said track to receive movement from the undulations thereof, rotatable means connected to said carriage, a supporting structure forming a rotatable bearing for said latter means, a shaft connected to said latter means, a gear on said shaft, a shaft connected to said wheel, a gear slidably keyed to said latter shaft and adapted to be slid into and out of engagement with said first gear, and means for sliding said second gear into and out of engagement with said first gear, substantially as described.

14. In an apparatus of the character described, a rotatable member, a supporting structure pivotally connected to said rotatable member, a wheel carried by said supporting structure, an undulated track upon which the wheel is designed to travel, an undulated platform, a plate mounted on said supporting structure and adapted to move in close proximity to the undulations of said platform, substantially as described.

15. In an apparatus of the character described, a rotatable member, a supporting structure pivotally connected to said rotatable member, a wheel carried by said supporting structure, an undulated track upon which the wheel is designed to travel, an undulated platform, a plate mounted on said supporting structure and adapted to move in close proximity to the undulations of said platform, a track on said plate and having a surface of varying distances above said plate, a carriage pivotally and rotatably mounted on said supporting structure, and means on said carriage adapted to engage said surface of the track, and means for rotating said carriage whereby the track imparts a rocking movement to the carriage, substantially as described.

16. In an apparatus of the character described, a rotatable member, a supporting structure pivotally connected to said rotatable member, a wheel carried by said supporting structure, an undulated track upon which the wheel is designed to travel, an undulated platform, a plate mounted on said supporting structure and adapted to move in close proximity to the undulations of said platform, a track on said plate and having a surface of varying distances above said plate, a carriage pivotally and rotatably mounted on said supporting structure, means on said carriage adapted to engage said surface of the track, and means operatively connected to said wheel for rotating said carriage whereby the track imparts a rocking movement to the carriage, substantially as described.

In testimony whereof I have signed my name to this specification in the presence of two subscribing witnesses.

JOHN METZLER.

Witnesses:
MARY A. INGLAR,
CHAS. E. POTTS.